US008457068B2

(12) United States Patent
Bonneville et al.

(10) Patent No.: US 8,457,068 B2
(45) Date of Patent: Jun. 4, 2013

(54) METHOD AND A DEVICE FOR ADJUSTING THE TRANSMISSION POWER OF SIGNALS

(75) Inventors: Herve Bonneville, Rennes Cedex (FR); Loic Brunel, Rennes Cedex (FR); Damien Castelain, Rennes Cedex (FR); Nicolas Gresset, Rennes Cedex (FR); Mourad Khanfouci, Rennes Cedex (FR); David Mottier, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 626 days.

(21) Appl. No.: 12/694,679

(22) Filed: Jan. 27, 2010

(65) Prior Publication Data

US 2010/0195619 A1 Aug. 5, 2010

(30) Foreign Application Priority Data

Feb. 5, 2009 (EP) .................................... 09152207

(51) Int. Cl.
H04W 4/00 (2009.01)
H04B 7/00 (2006.01)
(52) U.S. Cl.
USPC ............................................ 370/331; 455/522
(58) Field of Classification Search
None
See application file for complete search history.

(56) References Cited

U.S. PATENT DOCUMENTS

2007/0042799 A1* 2/2007 Jubin et al. ................... 455/522
2008/0146154 A1* 6/2008 Claussen et al. ............. 455/63.1
2008/0261602 A1 10/2008 Livneh
2009/0129341 A1* 5/2009 Balasubramanian et al. 370/331
2009/0280853 A1* 11/2009 Brisebois et al. ............. 455/522

FOREIGN PATENT DOCUMENTS

WO   WO 2008/055251 A2   5/2008

OTHER PUBLICATIONS

U.S. Appl. No. 12/692,960, filed Jan. 25, 2010, Bonneville, et al.
Holger Claussen, et al., "Performance of Marco- and Co-Channel Femtocells in a Hierarchical Cell Structure", The 18$^{th}$ Annual IEEE International Symposium on Personal, Indoor and Mobile Radio Communications (PIMRC"07), XP-031168593, Sep. 1, 2007, 5 pages.
"3$^{rd}$ Generation Partnership Project; Technical Specification Group Radio Access Networks; FDD Home NodeB RF Requirements Work Item Technical Report (Release 8)", 3GPP Draft TR 25.967 2.0.0, XP-050326896, Jan. 2009, 58 Pages.
Lester T. W. Ho, et al., "Effects of User-Deployed, Co-Channel Femtocells on the Call Drop Probability in a Residential Scenario", The 18$^{th}$ Annual IEEE International Symposium on Personal, Indoor and Mobile Radio Communications (PIMRC"07), XP-031168359, Sep. 1, 2007, 5 pages.

\* cited by examiner

*Primary Examiner* — Ian N Moore
*Assistant Examiner* — Brian T Le
(74) *Attorney, Agent, or Firm* — Oblon, Spivak, McClelland, Maier & Neustadt, L.L.P.

(57) ABSTRACT

The present invention concerns a method for transferring information enabling the adjustment of the transmission power of the signals transferred and/or received by a first base station through a wireless interface, a cell of the first base station being at least partly comprised in a cell of a second base station. A mobile terminal for which a handover has been or has to be conducted between the first and second base stations obtains information related to the path between the second base station and the mobile terminal and transfers information to the first base station.

9 Claims, 4 Drawing Sheets

METHOD AND A DEVICE FOR ADJUSTING THE TRANSMISSION POWER OF SIGNALS

The present invention relates generally to a method and a device for adjusting the transmission power of the signals transferred and/or received by a base station through a wireless interface.

Wireless cellular telecommunication networks are largely deployed but there are still some areas not covered by the base stations of the wireless cellular telecommunication network.

For example, the access to the wireless cellular telecommunication network might not be possible for a mobile terminal located in a building, if the signals radiated by the base stations are too attenuated.

Solutions are proposed today. Particular base stations, like home base stations or femto base stations, provide coverage areas within the buildings.

The home base stations or femto base stations provide a limited coverage area. Due to the constant coverage area size reduction and spectral efficiency increase, inter-cell interference has become a main issue. Inter-cell interference coordination (ICIC) techniques intend to solve the inter-cell interference problem. Classically, a mobile terminal reports to the base station the mobile terminal is currently served by, the interference it receives from neighbouring base stations and/or home base stations. Base stations exchange also messages between each other in order to allow an efficient ICIC.

Without shadowing, the interference level depends on the distance separating the base station and the home base station. In the downlink channel, the higher the distance between base station and home base station is, the larger the area in which the mobile terminals served by the base station and located in the vicinity of the home base station are strongly interfered is. For the uplink channel, the lower the distance between the base station and home base station is, the higher the interference created by the mobile terminals served by the home base station is for the mobile terminals served by the base station.

With shadowing, the interference level is not only related to the distance between the home base station and the base station. In downlink channel, the interference also depends on the shadowing between each mobile terminal close to the home base station and the base station. In uplink channel, the interference also depends on the shadowing between each mobile terminal served by the home base station and the base station.

Home base stations may enable a limited number of mobile terminals to access the wireless cellular telecommunication network through their respective resources. The mobile terminals allowed to access the resources of the network through the home base station may be determined by the owner of the home base station, the network or a combination of both.

The owner must be understood here in the general sense: the owner may only be the main user of the home base station, the owner may be the person who rents the home base station or the owner may be the person who accommodates the home base station in his house or office.

For example, only mobile terminals of the owner of the home base station and its family can access the wireless cellular telecommunication network through the home base station. These mobile terminals are associated with the home base station.

Base stations enable a large number of mobile terminals to access the wireless cellular telecommunication network through their respective resources. The mobile terminals allowed to access the resources of the network through the base station may be determined by the operator of the wireless cellular telecommunication network.

The cell of a base station is usually much larger than a cell of a home base station.

From above mentioned differences, an operator would probably like to prioritize traffic through base stations instead of the one through home base stations. Thus, priority should be put on minimizing the interference created by home base stations on signals from base stations and minimizing the interference created by mobile terminals served by home base stations on signals from mobile terminals served by base stations.

The present invention aims at avoiding that signals transferred between home base stations and mobile terminals served by home base stations interfere on signals transferred between base stations and mobile terminals served by the base stations.

To that end, the present invention concerns a method for adjusting the transmission power of the signals transferred and/or received by the first base station, a cell of the first base station being at least partly comprised in a cell of a second base station, characterised in that the method comprises the steps, executed by the first base station of:

obtaining information related to the coverage of the second base station and to the path or paths between the second base station and a mobile terminal or plural mobile terminals for which a handover or handovers has or have been conducted between the first and second base stations and/or to the path between the second base station and a mobile terminal for which a handover has to be conducted between the first and second base stations, computing a metric from information, adjusting, according to the computed metric, the transmission power of the signals transferred by the first base station to at least one mobile terminal served by the first base station and/or the transmission power of the signals transferred to the first base station by at least one mobile terminal served by the first base station.

The present invention concerns also a device for adjusting the transmission power of the signals transferred and/or received by the first base station, a cell of the first base station being at least partly comprised in a cell of a second base station, characterised in that the device is included in the first base station and comprises:

means for obtaining information related to the coverage of the second base station and related to the path or paths between the second base station and a mobile terminal or plural mobile terminals for which a handover or handovers has or have been conducted between the first and second base stations and/or to the path between the second base station and a mobile terminal for which a handover has to be conducted between the first and second base stations, means for computing a metric from information, means for adjusting, according to the computed metric, the transmission power of the signals transferred by the first base station to at least one mobile terminal served by the first base station and/or the transmission power of the signals transferred to the first base station by at least one mobile terminal served by the first base station.

Thus, inter-cell interference of signals transferred and/or received by the first base station on signals transferred and/or received by the second base station is efficiently mitigated according to the path or paths between the second base station and a mobile terminal or terminals performing handover or handovers and to the coverage of the second base station. The obtained path or paths approximates or approximate the path gain or gains or path distance or distances between the second base station and mobile terminal or terminals served by the second base station and which is or are close to the first base station.

This or these mobile terminals is or are located in an area in which the signals transferred by the first base station interfere strongly on mobile terminals served by the second base station. When the path or paths is or are path gain or gains or path distance or distances, the lower the path gain or gains is or are or the higher the path distance or distances is or are, the larger the area is.

The obtained path or paths also approximates or approximate the path gain or gains or path distance or distances between the second base station and mobile terminal or terminals served by the first base station.

This or these path gain or gains or distance or distances relates or relate to the level of uplink interference created at the second base station by the signals transferred by the at least one mobile terminal served by the first base station. When the path or paths is or are a path gain or gains or path distance or distances, the higher the path gain or gains is or are or the lower the path distance or distances is or are, the larger the interference is.

According to a particular feature, information related to the coverage of the second base station and related to the path or paths between the second base station and the mobile terminal or the plural mobile terminals for which the handover or handovers has or have been conducted between the first and second base stations and/or to the path between the second base station and the mobile terminal for which the handover has to be conducted between the first and second base stations is received by the first base station from the second base station and is information related to the path or paths between the second base station and the mobile terminal or plural mobile terminals for which the handover or handovers has or have been and/or to the path between the second base station and the mobile terminal for which the handover has to be conducted between the first and second base stations divided by information related to the coverage of the second base station.

Thus, the tasks are simplified as the coverage of the second base station can be easily determined at the second base station. If a handover is conducted from the second base station to the first base station, the information can be transmitted from the second base station to the first base station together with the other information about the mobile terminal, sometimes called context of the mobile terminal, which have to be transmitted during a handover process in order to facilitate the service continuity.

According to a particular feature, information related to the coverage of the second base station and related to the path or paths between the second base station and the mobile terminal or the plural mobile terminals for which the handover or handovers has or have been conducted between the first and second base stations and/or to the path between the second base station and the mobile terminal for which the handover has to be conducted between the first and second base stations is determined by the first base station by dividing information received from the second base station and which is related to the path or paths between the second base station and the mobile terminal or the plural mobile terminals for which the handover or handovers has or have been conducted between the first and second base stations and/or to the path between the second base station and the mobile terminal for which the handover has to be conducted between the first and second base stations by information determined by the first base station and related to the coverage of the second base station.

Thus, the second base station does not have to make any extra computation for the purpose of an inter-cell interference coordination process which takes place in the first base station.

According to a particular feature, information related to the coverage of the second base station and related to the path between the second base station and the mobile terminal for which the handover has been or has to be conducted between the first and second base stations is determined by the first base station by dividing information received from the mobile terminal and which is related to the path between the second base station and the mobile terminal for which the handover has been or has to be conducted between the first and second base stations by information determined by the first base station and related to the coverage of the second base station.

Thus, no additional signalling between the first base station and the second base station is needed. The backhaul usage is minimized.

If the handover is conducted from the second base station to the first base station, the mobile terminal can store the information before handover and transmit it to the first base station when handover has been completed.

According to a particular feature, information related to the coverage of the second base station and related to the path or paths between the second base station and the mobile terminal or the plural mobile terminals for which the handover or handovers has or have been conducted between the first and second base stations and/or to the path between the second base station and the mobile terminal for which the handover has to be conducted between the first and second base stations is derived from the transmission power and/or modulation and coding scheme for transmission by/to the second base station of data intended for/from the mobile terminal or mobile terminals for which the handover or handovers has or have been conducted between the first and second base stations and/or to the path between the second base station and the mobile terminal for which the handover has to be conducted.

Thus, the first base station can extract an information on the path gain or path gains between the first base station and the mobile terminal or terminals for which a handover or handovers has or have been conducted between the first and second base stations and/or to the path gain between the second base station and the mobile terminal for which the handover has to be conducted between the first and second base stations from the transmission power and/or modulation and coding scheme.

Indeed, the higher the transmission power or powers is or are and the lower the spectral efficiency or efficiencies of the modulation and coding scheme or schemes is or are, the lower the path gain or gains is or are. Every propagation characteristic is included in one path gain, including also transmit and receive antenna patterns and shadowing.

According to a particular feature, information related to the coverage of the second base station and related to the path or paths between the second base station and the mobile terminal or the plural mobile terminals for which the handover or handovers has or have been conducted between the first and second base stations and/or to the path between the second base station and the mobile terminal for which the handover has to be conducted between the first and second base stations is derived from the round trip delay or delays between the second base station and the mobile terminal or mobile terminals for which the handover or handovers has or have been conducted between the first and second base stations and/or to the round trip delay between the second base station and the mobile terminal for which the handover has to be conducted between the first and second base stations.

Thus, the first base station is able to evaluate the path distance or paths distances between the second base station and the mobile terminal or mobile terminals for which a handover or handovers has or have been conducted between the first and second base stations and/or the path distance between the second base station and the mobile terminal for which a handover has to be conducted between the first and second base stations very accurately from the round trip delay.

Indeed, a round trip delay between the second base station and one mobile terminal is directly linked to the distance between the second base station and the mobile terminal via the light celerity.

The round trip delay is usually evaluated at the second base station and transmitted to each mobile terminal via the timing advance command, the timing advance value being equal or very close to the round trip delay.

The present invention uses information which are classically transferred by the second base station for another purpose.

The present invention concerns also a method for transferring information enabling the adjustment of the transmission power of the signals transferred and/or received by a first base station through a wireless interface, a cell of the first base station being at least partly comprised in a cell of a second base station, characterised in that the method comprises the steps executed by the second base station of:
    obtaining information related to the coverage of the second base station and related to the path between the second base station and a mobile terminal or plural mobile terminals for which a handover or handovers has or have been conducted between the first and second base stations and/or to the path between the second base station and one mobile terminal for which a handover has to be conducted between the first and second base stations,
    transferring information to the first base station.

The present invention concerns also a device for transferring information enabling the adjustment of the transmission power of the signals transferred and/or received by a first base station through a wireless interface, a cell of the first base station being at least partly comprised in a cell of a second base station, characterised in that the device is included in the second base station and comprises:
    means for obtaining information related to the path or paths between the second base station and a mobile terminal or plural mobile terminals for which a handover or handovers has or have been conducted between the first and second base stations and/or to the path between the second base station and a mobile terminal for which a handover has to be conducted between the first and second base stations and related to the coverage of the second base station,
    means for transferring information to the first base station.

Thus, the tasks are simplified as the coverage of the second base station can be easily determined at the second base station. If the handover is conducted from the second base station to the first base station, the information can be transmitted from the second base station to the first base station together with the other information about one mobile terminal, sometimes called context of the mobile terminal, which have to be transmitted during a handover process in order to facilitate the service continuity.

The present invention concerns also a method for transferring information enabling the adjustment of the transmission power of the signals transferred and/or received by a first base station through a wireless interface, a cell of the first base station being at least partly comprised in a cell of a second base station, characterised in that the method comprises the steps executed by a mobile terminal for which a handover has been or has to be conducted between the first and second base stations of:
    obtaining information related to the path between the second base station and the mobile terminal,
    transferring information to the first base station.

The present invention concerns also a device for transferring information enabling the adjustment of the transmission power of the signals transferred and/or received by a first base station through a wireless interface, a cell of the first base station being at least partly comprised in a cell of a second base station, characterised in that the device is included in the mobile terminal for which a handover has been or has to be conducted between the first and second base stations and comprises:
    means for obtaining information related to the path between the second base station and the mobile terminal,
    means for transferring information to the first base station.

Thus, no additional signalling between the first base station and the second base station is needed. The backhaul usage is minimized. If the handover is conducted from the second base station to the first base station, the mobile terminal can store the information before handover and transmit it to the first base station when handover has been completed.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and apparatus according to the invention, they will not be repeated here.

The characteristics of the invention will emerge more clearly from a reading of the following description of an example embodiment, the said description being produced with reference to the accompanying drawings, among which:

Figure 5:
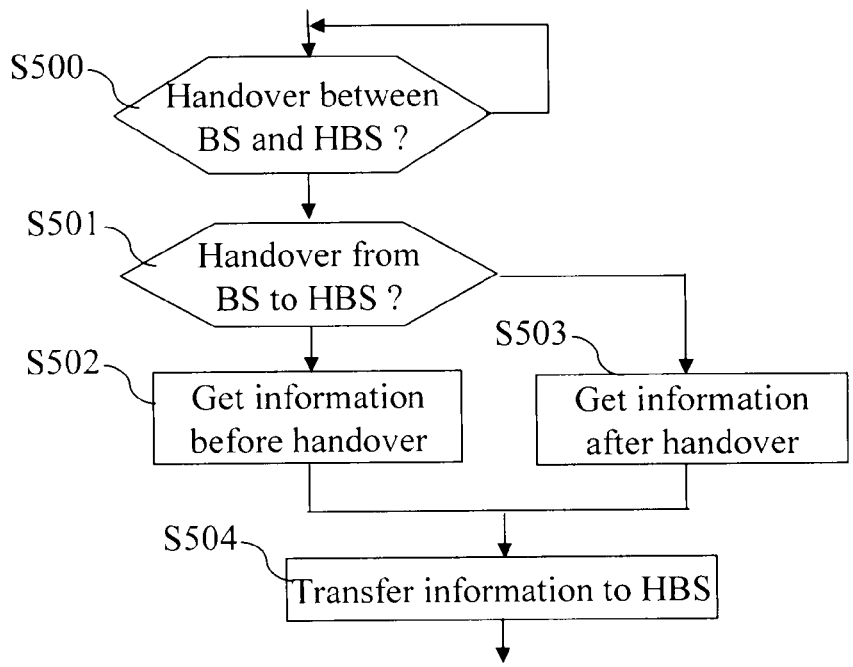
Figure 6:
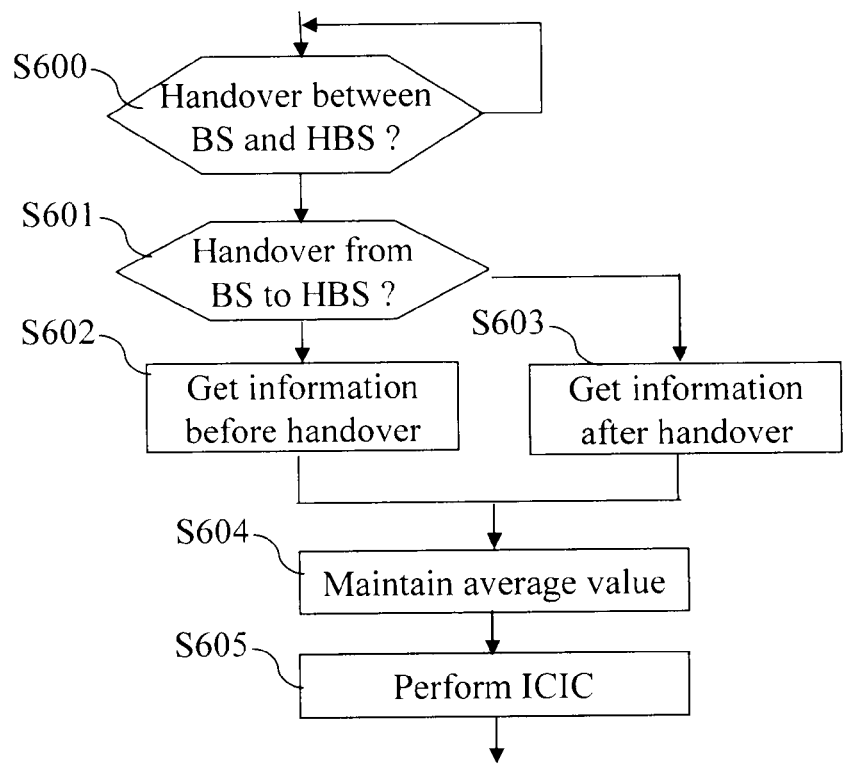
Figure 7:
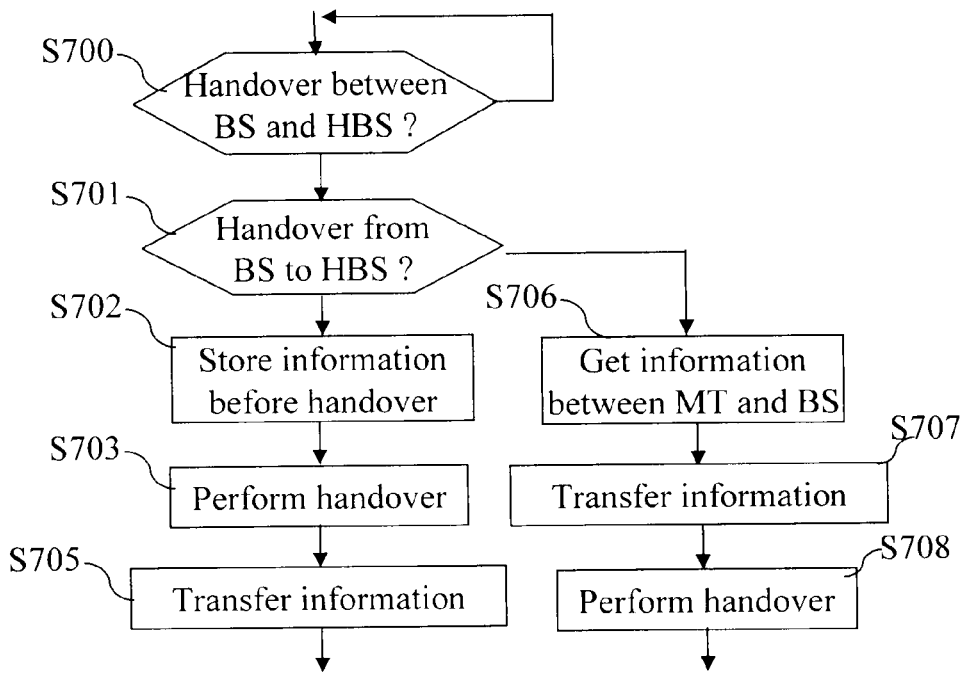
Figure 8:
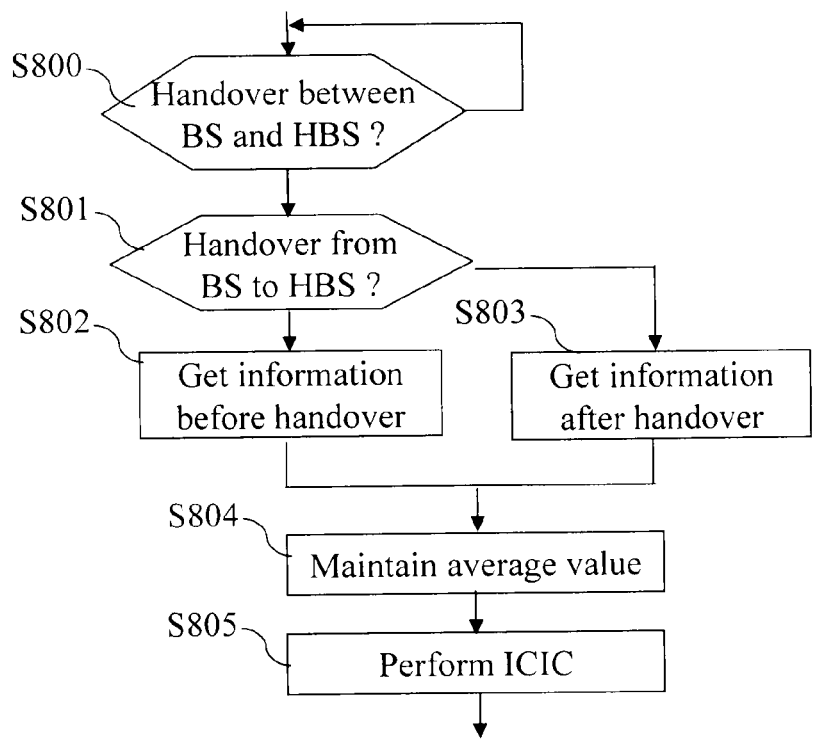

FIG. 5 discloses an example of an algorithm executed by a base station according to a first mode of realisation of the present invention;

FIG. 6 discloses an example of an algorithm executed by a home base station according to the first mode of realisation of the present invention;

FIG. 7 discloses an example of an algorithm executed by a mobile terminal according to a second mode of realisation of the present invention;

FIG. 8 discloses an example of an algorithm executed by a home base station according to the second mode of realisation of the present invention.

Figure 1:
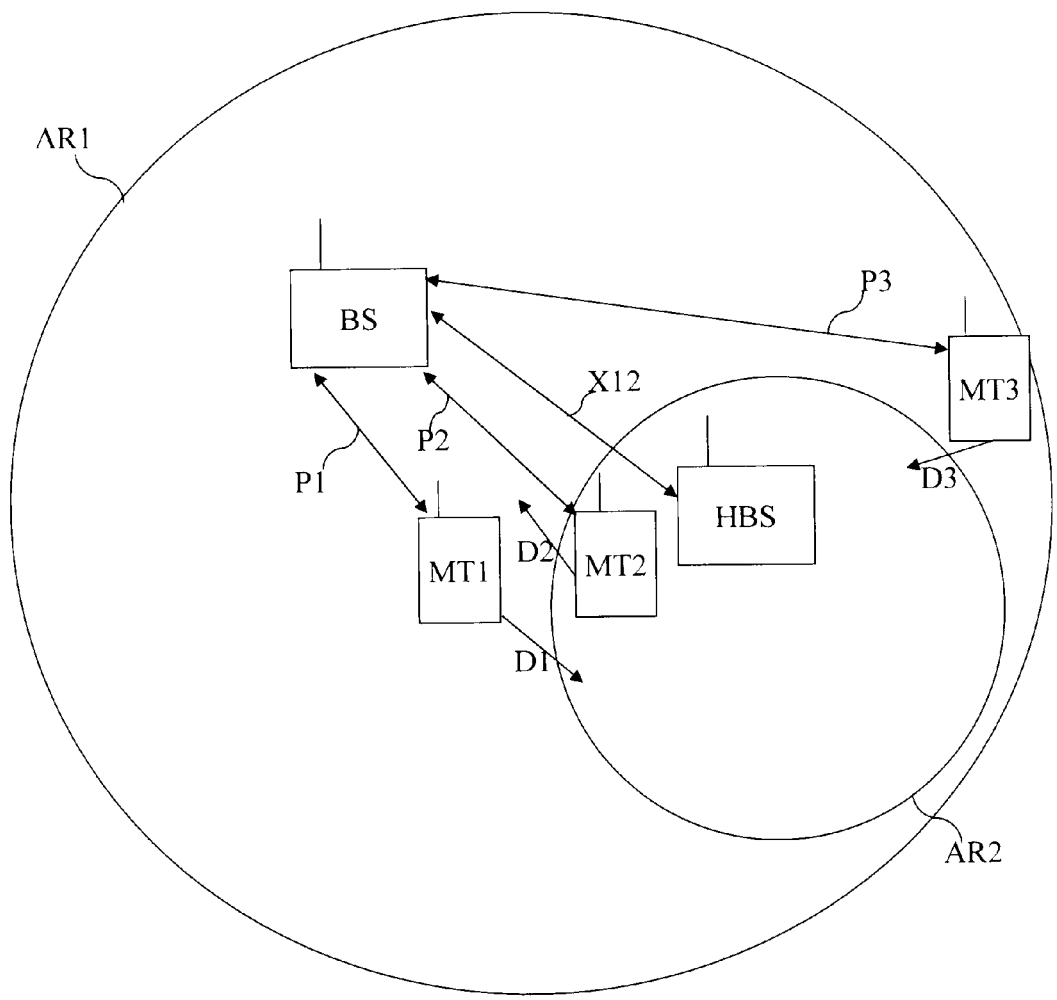
FIG. 1 represents a wireless cellular telecommunication network in which the present invention is implemented.

FIG. 1 represents a wireless cellular telecommunication network in which the present invention is implemented.

In FIG. 1, two base stations BS and HBS of a wireless cellular telecommunication network and three mobile terminals MT1, MT2 and MT3 are shown.

Only two base stations BS and HBS and three mobile terminals MT1, MT2 and MT3 are shown but we can understand that the present invention works when a more important number of base stations BS and/or HBS, and/or a more important number of mobile terminals MT exist.

More particularly, the present invention is also adapted in case the cell of the base station HBS is at least partly comprised in cells of plural base stations BS.

The base station BS is for example a macro base station of a wireless cellular telecommunication network and the base station HBS is for example a home base station named also femto base station or pico base station.

The home base station HBS is for example located at home and may enable mobile terminals MT associated to the home base station HBS to access the wireless cellular telecommunication network.

The home base station HBS may or may not be located in the cell of the base station BS but the cell AR2 of the home base station HBS is at least partly comprised in the cell AR1 of the base station BS.

For example, the mobile terminals MT1 and MT3 are served by the base station BS and are moving according to the respective directions shown by the respective arrows D1 and D3. When the mobile terminals MT1 and MT3 will enter the area AR2, a handover should be performed for the mobile terminals MT1 and MT3 from the base station BS to the home base station HBS if the mobile terminals MT1 and MT3 are allowed to access the resources of the network through the home base station HBS.

The mobile terminal MT2 is served by the home base station HBS and is moving according to the direction shown by the arrow D2. When the mobile terminal MT2 will leave the area AR2, a handover should be performed for the mobile terminal MT2 from the home base station HBS to the base station BS.

When a mobile terminal MT1 to MT3 is served by a base station BS or a home base station HBS, it can receive or establish or continue a communication with a remote telecommunication device.

The base station BS is able to receive signals transferred by mobile terminals MT which are located in the area AR1. The base station BS transfers signals which can be received and processed by mobile terminals MT located in the area AR1. The area AR1 is the coverage area or the cell of the base station BS.

The home base station HBS transfers signals which can be received and processed by mobile terminals MT located in the area AR2.

The area AR2 is the coverage area or the cell of the home base station HBS and is at least partly comprised in the area AR1.

The mobile terminal MT2 is located in the areas AR1 and AR2.

The mobile terminals MT1 and MT3 are located in the area AR1.

The arrow noted P1 represents the wireless path between the base station BS and the mobile terminal MT1. The arrow noted P2 represents the wireless path between the base station BS and the mobile terminal MT2. The arrow noted P3 represents the wireless path between the base station BS and the mobile terminal MT3.

The link X12 represents a wired link established on a telecommunication network between the base station BS and the home base station HBS.

According to the invention, information related to the coverage of the second base station and related to the path or paths between the second base station and a mobile terminal or plural mobile terminals for which a handover or handovers has or have been conducted between the first and second base stations and/or to the path between the second base station and a mobile terminal for which a handover has to be conducted between the first and second base stations is or are obtained, a metric is computed from this or these information and the transmission power of the signals transferred by the first base station to at least one mobile terminal served by the first base station and/or the transmission power of the signals transferred to the first base station by at least one mobile terminal served by the first base station is or are adjusted according to the computed metric.

Figure 2:
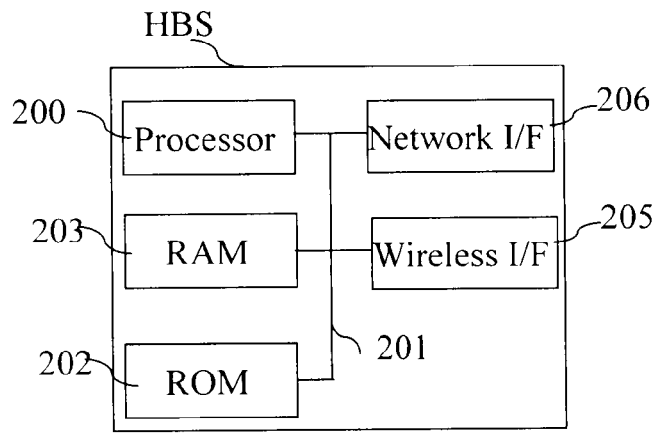
FIG. 2 is a diagram representing the architecture of a home base station in which the present invention is implemented.

FIG. 2 is a diagram representing the architecture of a home base station in which the present invention is implemented.

The home base station HBS has, for example, an architecture based on components connected together by a bus 201 and a processor 200 controlled by the program as disclosed in FIG. 6 or 8.

The bus 201 links the processor 200 to a read only memory ROM 202, a random access memory RAM 203, a wireless interface 205 and a network interface 206.

The memory 203 contains registers intended to receive variables and the instructions of the program related to the algorithm as disclosed in FIG. 6 or 8.

The processor 200 controls the operation of the network interface 206 and of the wireless interface 205.

The read only memory 202 contains instructions of the program related to the algorithm as disclosed in FIG. 6 or 8, which are transferred, when the home base station HBS is powered on, to the random access memory 203.

The home base station HBS may be connected to a telecommunication network through the network interface 206. For example, the network interface 206 is a DSL (Digital Subscriber Line) modem, or an ISDN (Integrated Services Digital Network) interface, etc. Through the network interface 206, the home base station HBS may transfer messages to the base station BS.

The wireless interface 205 and the network interface 206 are the resources of the home base station HBS used by a mobile terminal MT in order to access the wireless cellular telecommunication network when the mobile terminal MT establishes or receives a communication with a remote telecommunication device.

The wireless interface 205 comprises means for adjusting the transmission power of signals transferred by the home base station HBS and/or the transmission power of signals transferred to the home base station HBS by the mobile terminals served by the home base station HBS according to an inter cell interference coordination (ICIC) procedure.

Figure 3:
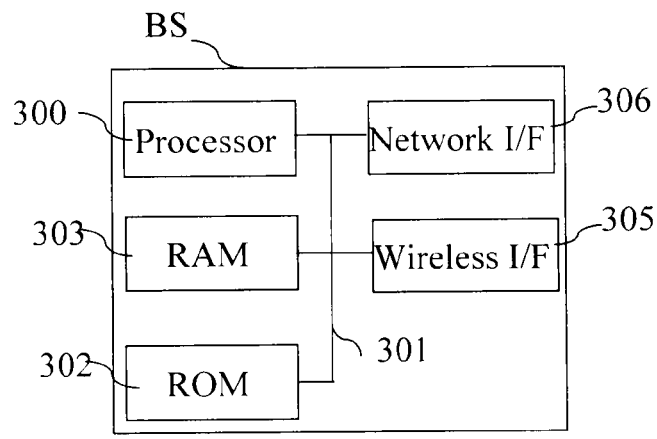
FIG. 3 is a diagram representing the architecture of a base station in which the present invention is implemented.

FIG. 3 is a diagram representing the architecture of a base station in which the present invention is implemented.

The base station BS has, for example, an architecture based on components connected together by a bus 301 and a processor 300 controlled by the program as disclosed in FIG. 5.

The bus 301 links the processor 300 to a read only memory ROM 302, a random access memory RAM 303, a wireless interface 305 and a network interface 306.

The memory 303 contains registers intended to receive variables and the instructions of the program related to the algorithm as disclosed in FIG. 5.

The processor 300 controls the operation of the network interface 306 and of the wireless interface 305.

The read only memory 302 contains instructions of the program related to the algorithm as disclosed in FIG. 5, which are transferred, when the base station BS is powered on, to the random access memory 303.

The base station BS may be connected to a telecommunication network through the network interface 306. For example, the network interface 306 is a DSL modem, or an ISDN interface, etc. Through the network interface 306, the base station BS may transfer messages to the home base station HBS.

The wireless interface 305 and the network interface 306 are the resources of the base station BS used by a mobile terminal MT in order to access the wireless cellular telecommunication network when the mobile terminal MT establishes or receives a communication with a remote telecommunication device.

Figure 4:
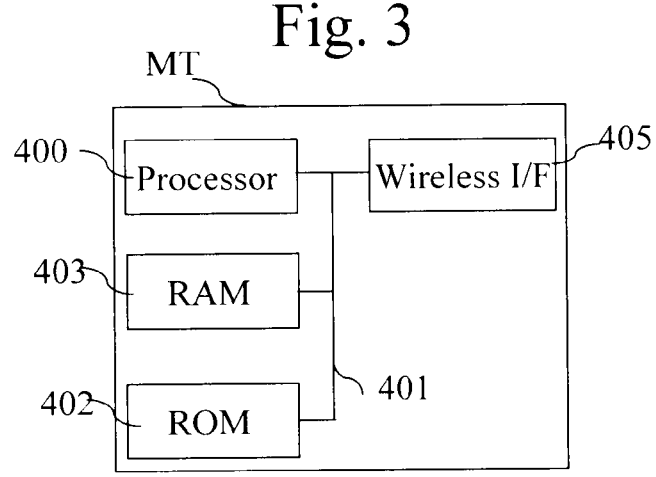
FIG. 4 is a diagram representing the architecture of a mobile terminal in which the present invention is implemented.

FIG. 4 is a diagram representing the architecture of a mobile terminal in which the present invention is implemented.

The mobile terminal MT has, for example, an architecture based on components connected together by a bus 401 and a processor 400 controlled by the program as disclosed in FIG. 7.

The bus 401 links the processor 400 to a read only memory ROM 402, a random access memory RAM 403 and a wireless interface 405.

The memory 403 contains registers intended to receive variables and the instructions of the program related to the algorithm as disclosed in FIG. 7.

The processor 400 controls the operation of the wireless interface 405.

The read only memory 402 contains instructions of the program related to the algorithm as disclosed in FIG. 7, which are transferred, when the mobile terminal MT is powered on, to the random access memory 403.

The wireless interface 405 comprises means for controlling the transmission power of signals according to an inter cell interference coordination (ICIC) procedure.

FIG. 5 discloses an example of an algorithm executed by a base station according to a first mode of realisation of the present invention.

More precisely, the present algorithm is executed by the processor 300 of the base station BS.

For the sake of simplicity, the present algorithm will be disclosed when a handover needs to be performed for one mobile terminal. The present invention is also applicable when a handover needs to be performed for plural mobile terminals in order to continue ongoing communications with remote telecommunication devices.

In that case, the present algorithm is executed for each mobile terminal MT for which a handover needs to be performed.

At step S500, the processor 300 checks if a handover needs to be performed for a mobile terminal MT in order to continue an ongoing communication with a remote telecommunication device. The handover of the ongoing communication may be executed from the base station BS to the home base station HBS or may be executed from the home base station HBS to the base station BS.

If a handover needs to be performed for a mobile terminal MT in order to continue an ongoing communication with a remote telecommunication device, the processor 300 moves to step S501. Otherwise, the processor 300 returns to step S500.

At step S501, the processor 300 checks if the handover of the ongoing communication has to be executed from the base station BS to the home base station HBS.

If the handover of the ongoing communication has to be executed from the base station BS to the home base station HBS, the processor 300 moves to step S502.

If the handover of the ongoing communication has to be executed from the home base station HBS to the base station BS, the processor 300 moves to step S503.

At step S502, the processor 300 gets information related to the path or paths between the base station BS and a mobile terminal or plural mobile terminals MT for which a handover or handovers has or have been conducted between the home base station HBS and the base station BS and/or to the path between the base station BS and a mobile terminal for which a handover has to be conducted between the home base station HBS and the base station BS.

Information to the path between the base station BS and the mobile terminal MT for which a handover has to be conducted between the home base station HBS and the base station BS may be the timing advance information which is representative of the round-trip delay between the mobile terminal MT and base station BS that must be applied on signals the mobile terminal MT should send to base station BS.

The timing advance information is representative of the path between the mobile terminal MT and base station BS, more precisely it is representative of the distance between the mobile terminal MT and the base station BS.

As the mobile terminal MT is located close to the boundary of the cell of the home base station HBS, the timing advance information is representative of the path between the home base station HBS and the base station BS.

Information to the path between the base station BS and the mobile terminal MT for which a handover has to be conducted between the home base station HBS and the base station BS may be the timing advance information which is representative of round-trip delay between the mobile terminal MT and base station BS divided by the timing advance information which is representative of the maximum round trip delay that corresponds to the coverage of the base station BS.

As the mobile terminal MT is located close to the boundary of the cell of the home base station HBS, the timing advance information may be representative of round-trip delay between the home base station HBS and base station BS divided by timing advance information which is representative of the maximum round trip delay that corresponds to the coverage of the base station BS.

Information related to the paths between the base station BS and a mobile terminal or mobile terminals MT for which a handover or handovers has or have been conducted between the home base station HBS and/or to the path between the base station BS and a mobile terminal for which a handover has to be conducted between the home base station HBS and the base station BS may be the average of timing advance information which are representative of round-trip delays between the base station BS and mobile terminals MT which conduct handovers between the base station BS and home base station HBS.

Information related to the paths between the base station BS and a mobile terminal or mobile terminals MT for which a handover or handovers has or have been conducted between the home base station HBS and/or to the path between the base station BS and a mobile terminal for which a handover has to be conducted between the home base station HBS and the base station BS may be the average of timing advance information which are representative of round-trip delays between base station BS and mobile terminals MT which conduct handovers between the base station BS and home base station HBS divided by the timing advance information which is representative of the maximum round trip delay that corresponds to the coverage of the base station BS.

Information related to the path between the base station BS and the mobile terminal MT for which a handover has to be conducted between the home base station HBS and the base station BS may be the path gain between base station BS and mobile terminal MT estimated from the downlink and/or uplink transmission power and/or modulation and coding scheme (MCS) for data transmission intended for/from the mobile terminal MT.

As the mobile terminal MT is located close to the boundary of the cell AR2 of the home base station HBS, the downlink and/or uplink transmission power and/or modulation and coding scheme may be representative of the path gain between home base station HBS and base station BS.

Information related to the path between the base station BS and the mobile terminal MT for which a handover has to be conducted between the home base station HBS and the base station BS may be the path gain between base station BS and mobile terminal MT estimated from the downlink and/or uplink transmission power and/or MCS for data transmission intended for/from the mobile terminal MT divided by the worst path gain in the cell of the base station BS.

Information related to the paths between the base station BS and mobile terminals MT for which handovers have been conducted between the home base station HBS and the base station BS may be the average of path gains between base station BS and mobile terminals MT which conduct handovers between the base station BS and home base station HBS.

As the mobile terminals MT are located close to the boundary of the cell of the home base station HBS, the average of path gains may be representative of the path gain between home base station HBS and base station BS.

As information is an average, information is less sensible to particular events.

Information related to the paths between the base station BS and a mobile terminal or mobile terminals MT for which handovers have been conducted between the home base station HBS and the base station BS may be the average of path gains between base station BS and mobile terminals MT which conduct handover between the base station BS and home base station HBS divided by the worst path gain in the cell of the base station BS.

Information related to the mobile terminal or terminals MT for which the handover has to be performed may be any combination of above mentioned information.

Once above mentioned information has been obtained, the processor 300 commands the execution of the handover between the base station BS and the home base station HBS.

At next step S504 the processor 300 commands the transfer through the network interface 306 of information previously obtained.

After that the processor 300 returns to step S500.

At step S503, the processor 300 commands the execution of the handover or handovers between the home base station HBS and the base station BS.

Once the handover or handovers is or are completed, the processor 300 gets, for each mobile terminal MT for which the handover has been performed, information related to the path between the base station BS and mobile terminal MT.

Information related to the path between the base station BS and the mobile terminal or mobile terminals MT are as the ones disclosed at step S502.

After that the processor 300 moves to step S504 already disclosed.

FIG. 6 discloses an example of an algorithm executed by a home base station according to the first mode of realisation of the present invention.

For the sake of simplicity, the present algorithm will be disclosed when a handover needs to be performed for one mobile terminal. The present invention is also applicable when a handover needs to be performed for plural mobile terminals in order to continue ongoing communications with remote telecommunication devices.

In that case, the present algorithm is executed for each mobile terminal MT for which a handover needs to be performed.

More precisely, the present algorithm is executed by the processor 200 of the home base station BS.

At step S600, the processor 200 checks if a handover needs to be performed for a mobile terminal MT in order to continue an ongoing communication with a remote telecommunication device. The handover of the ongoing communication may be executed from the base station BS to the home base station HBS or may be executed from the home base station HBS to the base station BS.

If a handover needs to be performed for a mobile terminal MT in order to continue an ongoing communication with a remote telecommunication device, the processor 200 moves to step S601. Otherwise, the processor 200 returns to step S600.

At step S601, the processor 200 checks if the handover of the ongoing communication has to be executed from the base station BS to the home base station HBS.

If the handover of the ongoing communication has to be executed from the base station BS to the home base station HBS, the processor 200 moves to step S602.

If the handover of the ongoing communication has to be executed from the home base station HBS to the base station BS, the processor 200 moves to step S603.

At step S602, the processor 200 gets through the network interface 206 information related to the path or paths between the base station BS and a mobile terminal or plural mobile terminals MT for which a handover or handovers has or have been conducted between the home base station HBS and the base station BS and/or to the path between the base station BS and a mobile terminal for which a handover has to be conducted between the home base station HBS and the base station BS.

This or these information can be received before the handover or handovers is or are completed together with other information on the mobile terminal or terminals MT, also called the context of the mobile terminal. However, the present invention is also applicable when this information is received after a handover procedure is completed.

Information related to the path or paths between the base station BS and a mobile terminal or plural mobile terminals MT for which a handover or handovers has or have been conducted between the home base station HBS and the base station BS and/or to the path between the base station BS and a mobile terminal MT for which a handover has to be conducted between the home base station HBS and the base station BS are at least partly received from the base station BS and are as the one transferred at step S504 of the FIG. 5.

If information related to the path between the base station BS and a mobile terminal MT for which a handover has to be conducted between the home base station HBS and the base station BS is the timing advance information, the processor 200 further obtains the coverage of the base station BS and divides the timing advance information by the timing advance information which corresponds to the maximum coverage of the base station BS.

The timing advance information which corresponds to the maximum coverage of the base station BS may be transferred by the base station BS and received through the network interface 206 or may be determined by the processor 200.

For that, the processor 200 commands the wireless interface 205 in order to search a RACH response transferred by the base station BS to a mobile terminal MT in response to a RACH message (random access message on the physical random access channel) transferred by the mobile terminal MT.

The wireless interface 205 scans the downlink signals transferred by the base station BS in order to detect random access responses intended for mobile terminals MT. For example, if the random access procedure relies on TUEID, such scan is relatively simple because the number of TUEIDs is limited.

A TUEID is a temporary identifier which is picked up randomly by a mobile terminal MT among a limited number of known identifiers in order to perform the random access procedure. This temporary identifier may also be called random access identifier or random access radio network temporary identifier (RA-RNTI).

The TUEID is used until potential random access contention is resolved and an effective UEID is determined by the base station BS.

Information comprised in the RACH response may be representative of the maximum distance between the base station BS and a mobile terminal MT if the mobile terminal is located at the frontier or boundary of the cell AR1.

When the number of detected random access responses is high enough, the processor 200 takes the value which corresponds to the maximum distance, i.e., which may correspond to the coverage of the base station BS.

If information related to the paths between the base station BS and plural mobile terminals MT for which handovers have been conducted between the home base station HBS and the base station BS is the average of timing advance information which are representative of the round trip delays between base station BS and mobile terminals MT which conduct handovers between the base station BS and home base station HBS, the processor 200 further obtains the coverage of the base station BS and divides the average timing advance information by the timing advance information which corresponds to the maximum coverage of the base station BS.

The timing advance information which corresponds to the maximum coverage of the base station BS may be transferred by the base station BS and received through the network interface 206 or may be determined by the processor 200 as disclosed previously.

If information related to the path between the base station BS and a mobile terminal MT for which a handover has to be conducted between the home base station HBS and the base station BS is the path gain between base station BS and mobile terminal MT estimated from the downlink and/or uplink transmission power and/or modulation and coding scheme (MCS) for data transmission intended for/from the mobile terminal MT, the processor 200 further obtains the path gain which corresponds to the coverage of the base station BS, i.e., the minimum path gain in the coverage area of the base station BS, and divides the path gain for the mobile terminal MT by the path gain which corresponds to the coverage of the base station BS.

The path gain which corresponds to the coverage of the base station BS may be transferred by the base station BS and received through the network interface 206 or may be determined by the processor 200.

The wireless interface 205 scans the downlink signals transferred by the base station BS in order to detect random access responses intended for mobile terminals MT.

The random access responses may comprise the downlink and/or uplink transmission power and/or modulation and coding scheme for data transmission intended for/from the mobile terminal MT.

If information related to the paths between the base station BS and plural mobile terminals MT for which handovers have been conducted between the home base station HBS and the base station BS is the average of path gains between base station BS and mobile terminals MT which conduct handover between the base station BS and home base station HBS, the processor 200 further obtains the path gain which corresponds to the coverage of the base station BS and divides the average path gain information by the path gain which corresponds to the coverage of the base station BS. The path gain which corresponds to the coverage of the base station BS may be transferred by the base station BS and received through the network interface 206 or may be determined by the processor 200 as disclosed previously.

Information related to the mobile terminal MT for which the handover has to be performed may be any combination of above mentioned information.

Once above mentioned information have been obtained, the processor 200 memorises information in the RAM memory 203 and commands the execution of the handover between the home base station HBS and the base station BS.

At next step S604 the processor 200 determines from previously memorised information an average value.

At next step S605, the processor 200 determines, using the average value at step S804, at least one transmit power. The processor 200 applies a limitation to the home base station HBS transmit power and/or to the transmit powers of all the mobile terminals MT the home base station HBS serves. The limitation can be applied on the total transmit power but can also be per Hz, in order to avoid concentrating the total transmit power on a limited frequency resource too much. The mobile terminals MT the home base station HBS serves are informed that their maximum transmit power is limited to a given value.

After that the processor 200 returns to step S600.

At step S603, the processor 200 commands the execution of the handover between the home base station HBS and the base station BS.

Once the handover is executed, the processor 200 gets through the network interface 206 information related to the mobile terminal or mobile terminals MT for which the handover or handovers has or have been performed.

Information related to the path or paths between the base station BS and a mobile terminal or plural mobile terminals MT for which a handover or handovers has or have been conducted between the home base station HBS and the base station BS is or are at least partly received from the base station BS and is or are as disclosed at step S602 of the FIG. 6.

The processor 200 gets through the network interface 206 information related to the path or paths between the base station BS and a mobile terminal or plural mobile terminals MT for which a handover or handovers has or have been conducted between the home base station HBS and the base station BS in a similar way as the one disclosed at step S602 of the FIG. 6.

After that the processor 200 moves to step S604 already disclosed.

FIG. 7 discloses an example of an algorithm executed by a mobile terminal according to a second mode of realisation of the present invention.

More precisely, the present algorithm is executed by the processor 400 of the mobile terminal MT.

At step S700, the processor 400 checks if a handover needs to be performed for the mobile terminal in order to continue an ongoing communication with a remote telecommunication device. The handover of the ongoing communication may be executed from the base station BS to the home base station HBS or be may executed from the home base station HBS to the base station BS.

If a handover needs to be performed for the mobile terminal MT in order to continue an ongoing communication with a remote telecommunication device, the processor 400 moves to step S701. Otherwise, the processor 400 returns to step S700.

At step S701, the processor 400 checks if the handover of the ongoing communication has to be executed from the base station BS to the home base station HBS.

If the handover of the ongoing communication has to be executed from the base station BS to the home base station HBS, the processor 400 moves to step S702.

If the handover of the ongoing communication has to be executed from the home base station HBS to the base station BS, the processor 400 moves to step S706.

At step S702, the processor 400 gets information related to the path between the base station BS and the mobile terminal MT.

Information related to the path between the base station BS and the mobile terminal MT may be the timing advance information which is representative of the round-trip delay between the mobile terminal MT and base station BS that must be applied on signals the mobile terminal MT should send to base station BS.

The timing advance information is representative of the distance separating the mobile terminal MT and base station BS.

As the mobile terminal MT is located close to the boundary of the cell AR2 of the home base station HBS, the timing advance information is representative of the path between the home base station HBS and the base station BS.

Information related to the path between the base station BS and the mobile terminal MT may be the path gain between base station BS and mobile terminal MT estimated from the downlink and/or uplink transmission power and/or modulation and coding scheme (MCS) for data transmission intended for/from the mobile terminal MT. The downlink and/or uplink transmission power and/or modulation and coding scheme is representative of path gain between the mobile terminal MT and base station BS.

As the mobile terminal MT is located close to the boundary of the cell AR2 of the home base station HBS, the downlink and/or uplink transmission power and/or modulation and coding scheme may be representative of the path gain between home base station HBS and base station BS.

Information related to the path between the base station BS and the mobile terminal MT may be any combination of above mentioned information.

Once above mentioned information have been obtained, the processor 400 commands at step S703 the execution of the handover between the base station BS and the home base station HBS.

At next step S705, the processor 400 commands the transfer through the wireless interface 405 of information obtained at step S702.

After that, the processor 400 returns to step S700.

At step S706, the processor 400 gets information related to the path between the base station BS and the mobile terminal MT if the mobile terminal MT can communicate with the base station BS prior to the execution of the handover.

Information related to the mobile terminal MT are as the ones disclosed at step S702.

At next step S707, the processor 400 commands the transfer through the wireless interface 405 of information obtained at step S706.

At step S708, the processor 400 commands the execution of the handover from the home base station HBS to the base station BS.

After that the processor 400 returns to step S700.

FIG. 8 discloses an example of an algorithm executed by a home base station according to the second mode of realisation of the present invention.

More precisely, the present algorithm is executed by the processor 200 of the home base station HBS.

At step S800, the processor 200 checks if a handover needs to be performed for a mobile terminal MT in order to continue an ongoing communication with a remote telecommunication device. The handover of the ongoing communication may be executed from the base station BS to the home base station HBS or may be executed from the home base station HBS to the base station BS.

If a handover needs to be performed for a mobile terminal MT in order to continue an ongoing communication with a remote telecommunication device, the processor 200 moves to step S801. Otherwise, the processor 200 returns to step S800.

At step S801, the processor 200 checks if the handover of the ongoing communication has to be executed from the base station BS to the home base station HBS.

If the handover of the ongoing communication has to be executed from the base station BS to the home base station HBS, the processor 200 moves to step S803.

If the handover of the ongoing communication has to be executed from the home base station HBS to the base station BS, the processor 200 moves to step S802.

At step S802, the processor 200 gets information related to the path between the base station BS and the mobile terminal MT.

Information related to the path between the base station BS and the mobile terminal MT is at least partly received from the mobile terminal MT, through the wireless interface 205, and are as the one transferred at step S705 or S707 of the FIG. 7.

If information related to the path between the base station BS and the mobile terminal MT for which the handover has to be performed is the timing advance information, the processor 200 further obtains the coverage of the base station BS and divides the timing advance information by the timing advance information which corresponds to the maximum coverage of the base station BS.

The timing advance information which corresponds to the maximum coverage of the base station BS is determined by the processor 200 as disclosed at step S602 or S603 of the FIG. 6.

If information related to the path between the base station BS and the mobile terminal MT for which the handover has to be performed is the path gain between base station BS and mobile terminal MT estimated from the downlink and/or uplink transmission power and/or modulation and coding scheme (MCS) for data transmission intended for/from the mobile terminal MT from/for the base station BS, the processor 200 further obtains the path gain which correspond to the coverage of the base station BS, i.e., the minimum path gain in the coverage area of the base station BS, and divides the path gain for the mobile terminal MT by the path gain which corresponds to the coverage of the base station BS.

The path gain which corresponds to the coverage of the base station BS is determined by the processor 200 as disclosed at step S602 or S603 of the FIG. 6.

Information related to the path between the base station BS and the mobile terminal MT for which the handover has to be performed may be any combination of above mentioned information.

Once above mentioned information have been obtained, the processor 200 memorises information in the RAM memory 203 and commands the execution of the handover between the home base station HBS and the base station BS.

At next step S804 the processor 200 determines from previously memorised information an average value.

At next step S805, the processor 200 determines, using the average value at step S804, at least one transmit power. The processor 200 applies a limitation to the home base station HBS transmit power and/or to the transmit powers of all the mobile terminals MT the home base station HBS serves. The limitation can be applied on the total transmit power but can also be per Hz, in order to avoid concentrating the total transmit power on a limited frequency resource too much. The mobile terminals MT the home base station HBS serves are informed that their maximum transmit power is limited to a given value.

After that the processor 200 returns to step S800.

At step S803, the processor 200 commands the execution of the handover between the home base station HBS and the base station BS.

Once the handover is executed, the processor 200 gets information related to the mobile terminal MT for which the handover has been performed.

Information related to the mobile terminal MT for which the handover has been performed are at least partly received from the mobile terminal MT and are as the ones disclosed at step S802 of the FIG. 8.

The processor 200 gets information related to the mobile terminal MT for which the handover has been performed in a similar way as the one disclosed at step S802 of the FIG. 8.

After that the processor 200 moves to step S804 already disclosed.

Naturally, many modifications can be made to the embodiments of the invention described above without departing from the scope of the present invention.

The invention claimed is:

1. A method for adjusting transmission power of at least one of signals transmitted by a first base station and signals transmitted to the first base station, a cell of the first base station being at least partly comprised in a cell of a second base station, wherein the method is executed by the first base station and comprises:
    obtaining information related to a coverage area of the second base station and at least one of information related to a path between the second base station and at least one mobile terminal for which a handover has been previously conducted between the first and second base stations and information related to a path between the second base station and a mobile terminal for which a handover has to be conducted between the first and second base stations;
    computing a metric from the obtained information; and
    adjusting, according to the computed metric, the transmission power of the at least one of the signals transmitted by the first base station to at least one mobile terminal served by the first base station and the signals transmitted to the first base station by at least one mobile terminal served by the first base station, wherein
    the obtaining includes
        determining in the first base station the information related to the coverage area of the second base station,
        receiving in the first base station from the second base station the at least one of the information related to the path between the second base station and the at least one mobile terminal for which the handover has been previously conducted between the first and second base stations and the information related to the path between the second base station and the mobile terminal for which the handover has to be conducted between the first and second base stations, and
        dividing the received at least one of the information related to the path between the second base station and the at least one mobile terminal for which the handover has been previously conducted between the first and second base stations and the information related to the path between the second base station and the mobile terminal for which the handover has to be conducted between the first and second base stations by information determined in the first base station and related to the coverage area of the second base station.

2. The method according to claim 1, wherein
    the obtaining includes receiving in the first base station from the second base station the information related to the coverage area of the second base station, and
    the dividing includes dividing the at least one of the information related to the path between the second base station and the at least one mobile terminal for which the handover has been previously conducted between the first and second base stations and the information related to the path between the second base station and the mobile terminal for which the handover has to be conducted between the first and second base stations by the information related to the coverage area of the second base station.

3. The method according to claim 1, wherein the obtaining includes deriving the at least one of the information related to the path between the second base station and the at least one mobile terminal for which the handover has been previously conducted between the first and second base stations and the information related to the path between the second base station and the mobile terminal for which the handover has to be conducted between the first and second base stations from at least one of transmission power, modulation, and coding scheme used for communication between the second base station and the at least one mobile terminal for which the handover has been previously conducted or has to be conducted between the first and second base stations.

4. The method according to claim 1, wherein the obtaining includes deriving the at least one of the information related to the path between the second base station and the at least one mobile terminal for which the handover has been previously conducted between the first and second base stations and the information related to the path between the second base station and the mobile terminal for which the handover has to be conducted between the first and second base stations from at least one of round trip delay between the second base station and the at least one mobile terminal for which the handover has been previously conducted between the first and second base stations and round trip delay between the second base station and the mobile terminal for which the handover has to be conducted between the first and second base stations.

5. A device for adjusting transmission power of at least one of signals transmitted by a first base station and signals transmitted to the first base station, a cell of the first base station being at least partly comprised in a cell of a second base station, wherein the device is included in the first base station and comprises:

means for obtaining information related to a coverage area of the second base station and at least one of information related to a path between the second base station and at least one mobile terminal for which a handover has been previously conducted between the first and second base stations and information related to a path between the second base station and a mobile terminal for which a handover has to be conducted between the first and second base stations;

means for computing a metric from the obtained information; and means for adjusting, according to the computed metric, the transmission power of the at least one of the signals transmitted by the first base station to at least one mobile terminal served by the first base station and the signals transmitted to the first base station by at least one mobile terminal served by the first base station, wherein the means for obtaining includes means for determining in the first base station the information related to the coverage area of the second base station, means for receiving in the first base station from the second base station the at least one of the information related to the path between the second base station and the at least one mobile terminal for which the handover has been previously conducted between the first and second base stations and the information related to the path between the second base station and the mobile terminal for which the handover has to be conducted between the first and second base stations, and means for dividing the received at least one of the information related to the path between the second base station and the at least one mobile terminal for which the handover has been previously conducted between the first and second base stations and the information related to the path between the second base station and the mobile terminal for which the handover has to be conducted between the first and second base stations by information determined in the first base station and related to the coverage area of the second base station.

6. A method for transferring information enabling adjustment of transmission power of at least one of signals transmitted by a first base station and signals transmitted to the first base station through a wireless interface, a cell of the first base station being at least partly comprised in a cell of a second base station, wherein the method comprises:

obtaining, in the second base station, information related to a coverage area of the second base station and at least one of information related to a path distance between the second base station and at least one mobile terminal for which a handover has been previously conducted between the first and second base stations and information related to a path distance between the second base station and a mobile terminal for which a handover has to be conducted between the first and second base stations;

transferring the obtained information from the second base station to the first base station;

determining in the first base station the information related to the coverage area of the second base station;

receiving in the first base station from the second base station the at least one of the information related to the path between the second base station and the at least one mobile terminal for which the handover has been previously conducted between the first and second base stations and the information related to the path between the second base station and the mobile terminal for which the handover has to be conducted between the first and second base stations; and dividing, in the first base station, the received at least one of the information related to the path between the second base station and the at least one mobile terminal for which the handover has been previously conducted between the first and second base stations and the information related to the path between the second base station and the mobile terminal for which the handover has to be conducted between the first and second base stations by information determined in the first base station and related to the coverage area of the second base station.

7. A method for transferring information enabling adjustment of transmission power of at least one of signals transmitted by a first base station and signals transmitted to the first base station through a wireless interface, a cell of the first base station being at least partly comprised in a cell of a second base station, the method comprising:

obtaining, in a mobile terminal for which a handover has been or has to be conducted between the first and second base stations, information related to a path distance between the second base station and the mobile terminal;

transferring the obtained information to the first base station from the mobile terminal;

determining in the first base station information related to a coverage area of the second base station;

receiving in the first base station from the mobile terminal information related to a path distance between the second base station and the mobile terminal; and dividing the information received from the mobile terminal and which is related to the path distance between the second base station and the mobile terminal by information determined in the first base station and related to the coverage area of the second base station.

8. A device for transferring information enabling adjustment of transmission power of at least one of signals transmitted by a first base station and signals transmitted to the first base station through a wireless interface, a cell of the first base station being at least partly comprised in a cell of a second base station, wherein the device comprises:

means for obtaining, in the second base station, information related to a coverage area of the second base station and at least one of information related to a path distance between the second base station and at least one mobile terminal for which a handover has been previously conducted between the first and second base stations and information related to a path distance between the second base station and a mobile terminal for which a handover has to be conducted between the first and second base stations;

means for transferring the obtained information from the second base station to the first base station;

means for determining in the first base station the information related to the coverage area of the second base station;

means for receiving in the first base station from the second base station the at least one of the information related to the path between the second base station and the at least one mobile terminal for which the handover has been previously conducted between the first and second base stations and the information related to the path between the second base station and the mobile terminal for which the handover has to be conducted between the first and second base stations; and means for dividing, in the first base station, the received at least one of the information related to the path between the second base station and the at least one mobile terminal for which the handover has been previously conducted between the first and second base stations and the information related to the path between the second base station and the mobile terminal for which the handover has to be conducted between the first and second base stations by information determined in the first base station and related to the coverage area of the second base station.

9. A device for transferring information enabling adjustment of transmission power of at least one of signals transmitted by a first base station and signals transmitted to the first base station through a wireless interface, a cell of the first base station being at least partly comprised in a cell of a second base station, wherein the device comprises:

means for obtaining, in a mobile terminal for which a handover has been or has to be conducted between the first and second base stations, information related to a path distance between the second base station and the mobile terminal;

means for transferring the obtained information to the first base station from the mobile terminal;

means for determining in the first base station information related to a coverage area of the second base station;

means for receiving in the first base station from the mobile terminal information related to a path distance between the second base station and the mobile terminal; and means for dividing the information received from the mobile terminal and which is related to the path distance between the second base station and the mobile terminal by information determined in the first base station and related to the coverage area of the second base station.

* * * * *